United States Patent [19]

Fox et al.

[11] Patent Number: 5,002,132
[45] Date of Patent: Mar. 26, 1991

[54] HOOFED ANIMAL SHOE

[76] Inventors: Alfred E. Fox, P.O. Box 231, Newton, Mass. 02166; James B. Boulton, 16 Kingsview Rd., Marlborough, Mass. 01752

[21] Appl. No.: 410,924

[22] Filed: Sep. 22, 1989

[51] Int. Cl.$^5$ .............................................. A01L 5/00
[52] U.S. Cl. ........................................ 168/4; 168/13
[58] Field of Search ..................................... 168/4, 13

[56] References Cited

U.S. PATENT DOCUMENTS

| | | | |
|---|---|---|---|
| 522,789 | 7/1894 | Gibbs | 168/13 |
| 558,455 | 4/1896 | Lewty | 168/13 |
| 1,954,899 | 4/1934 | Thuillier | 168/13 |
| 2,043,359 | 6/1936 | Swanstrom | 168/13 |
| 3,469,631 | 9/1969 | Becker | 168/4 |
| 3,490,536 | 12/1968 | Hourlier | 168/4 |
| 3,494,422 | 2/1970 | Clark | 168/4 |
| 3,519,079 | 11/1968 | Bieber | 168/4 |
| 4,503,914 | 3/1985 | Voland | 168/18 |
| 4,605,071 | 8/1986 | McKibben | 168/12 |
| 4,844,172 | 7/1989 | Lee | 168/13 |

FOREIGN PATENT DOCUMENTS 2604607  8/1977  Fed. Rep. of Germany .......... 168/4

OTHER PUBLICATIONS

Sir Pegasus product literature.

*Primary Examiner*—Robert P. Swiatek
*Attorney, Agent, or Firm*—Fish & Richardson

[57] ABSTRACT

A durable, resilient plastic horseshoe including a first plastic polymer having a first durometer, and a second plastic polymer having a second durometer higher than the first durometer is disclosed, wherein when the shoe is placed on a foot of a hoofed animal and the animal places weight on the foot and causes the shoe to come in contact with the ground, the first plastic polymer is simultaneously in contact with the second plastic polymer and the ground, and the second plastic polymer is in contact with the first plastic polymer and free of contact with the foot.

8 Claims, 3 Drawing Sheets

HOOFED ANIMAL SHOE

BACKGROUND OF THE INVENTION

This invention relates to shoes to be used for animals, e.g., horses.

Plastic horseshoes are used on a horse as a lightweight means of reducing the shock to the horse's feet and legs that is generated when the horse's hoof and the horseshoe strike the ground. Means are employed to minimize the general tendency of plastic horseshoes to slip on the surface of the ground.

SUMMARY OF THE INVENTION

In general, the invention features a durable, resilient plastic horseshoe including a first plastic polymer having a first durometer, and a second plastic polymer having a second durometer higher than the first durometer, wherein when the shoe is placed on a foot of a hoofed animal and the animal places weight on the foot and causes the shoe to come in contact with the ground, the first plastic polymer is simultaneously in contact with the ground and the second plastic polymer, and the second plastic polymer is in contact with the first plastic polymer and free of contact with the foot.

In preferred embodiments the first plastic polymer is also simultaneously in contact with the foot, the second plastic polymer is also free of contact with the ground, both the first and second polymers are moldable polyurethane, and the second polyurethane polymer is configured in the form of a stiffening frame and reinforced with glass fiber.

A horseshoe composed of plastic polymers of different durometers, in which the lower durometer polymer is in contact with the ground, both absorbs and dissipates impact related shock while at the same time showing minimal slippage and excellent strength and durability. The lower durometer plastic polymer provides traction and is subjected to limited compression under the weight of the animal, and the energy from the impact related shock is dissipated through the higher durometer plastic polymer.

Other features and advantages of the invention will be apparent from the following description and from the claims when read in connection with the accompanying drawings in which:

DRAWINGS

STRUCTURE AND FABRICATION

Figure 1:
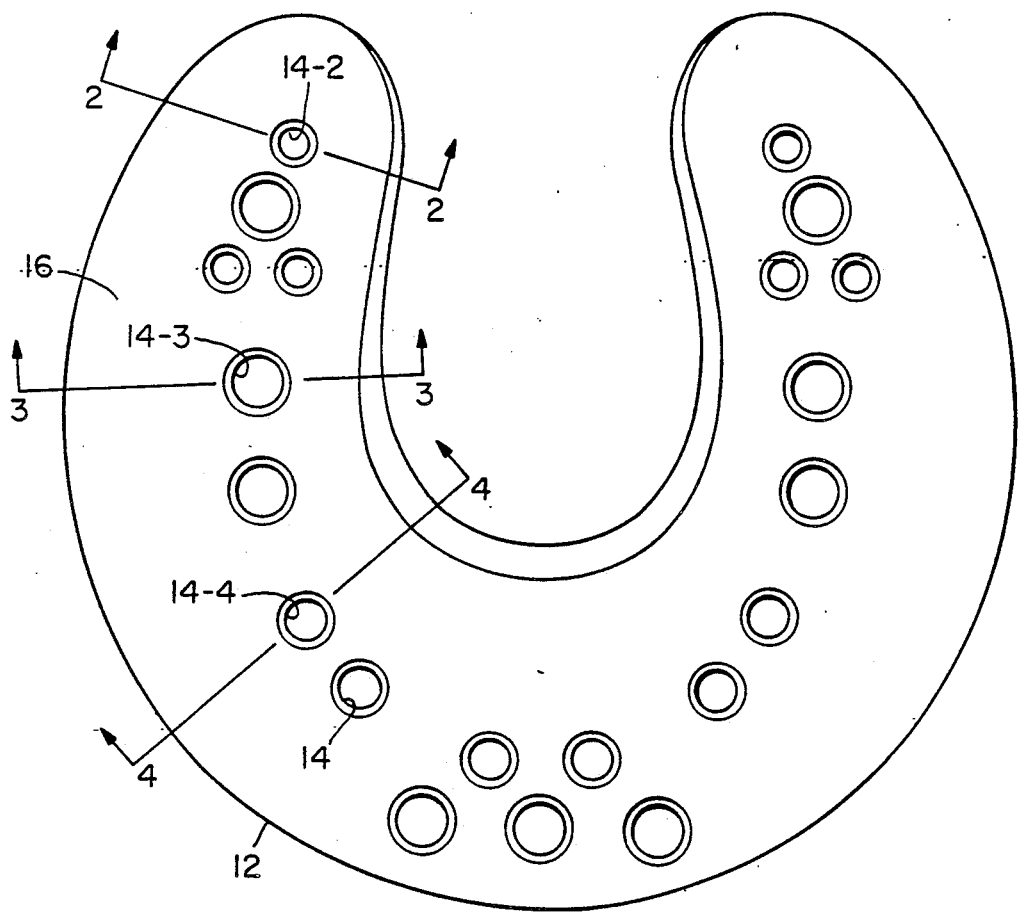
FIG. 1 is a view of the turf side of the primary frame structure of a shock absorbing horseshoe.
Figure 2:
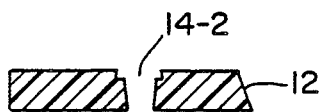
FIG. 2 is a sectional view at line 2—2 through FIG. 1.
Figure 3:
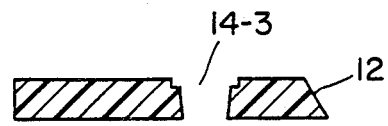
FIG. 3 is a sectional view at line 3—3 through FIG. 1.
Figure 4:
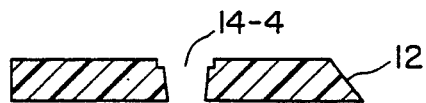
FIG. 4 is a sectional view at line 4—4 through FIG. 1.

Referring to FIGS. 1-4, a primary frame 12, composed of preferably the highest density reinforced urethane polymer available that is resilient but not brittle and that will hold a nail (e.g., 60 D polyurethane, 30% glass fiber filled, from Schulman Co., Detroit, Mich.), is fabricated by injection or pour molding or from a preformed sheet to form a horseshoe shaped structure approximately 0.375 inches thick, which contains, in the pattern shown, a set of tapered holes through its body. Each hole 14 has the larger end of its taper located in the outer or turf side surface 16 of frame 12. For hole 14-2 the top and bottom hole dimensions are, respectively, 0.315 inches and 0.200 inches; for hole 14-3, 0.435 inches and 0.300 inches; and for hole 14-4, 0.375 inches and 0.255 inches, causing a taper of about 10°.

Figure 5:
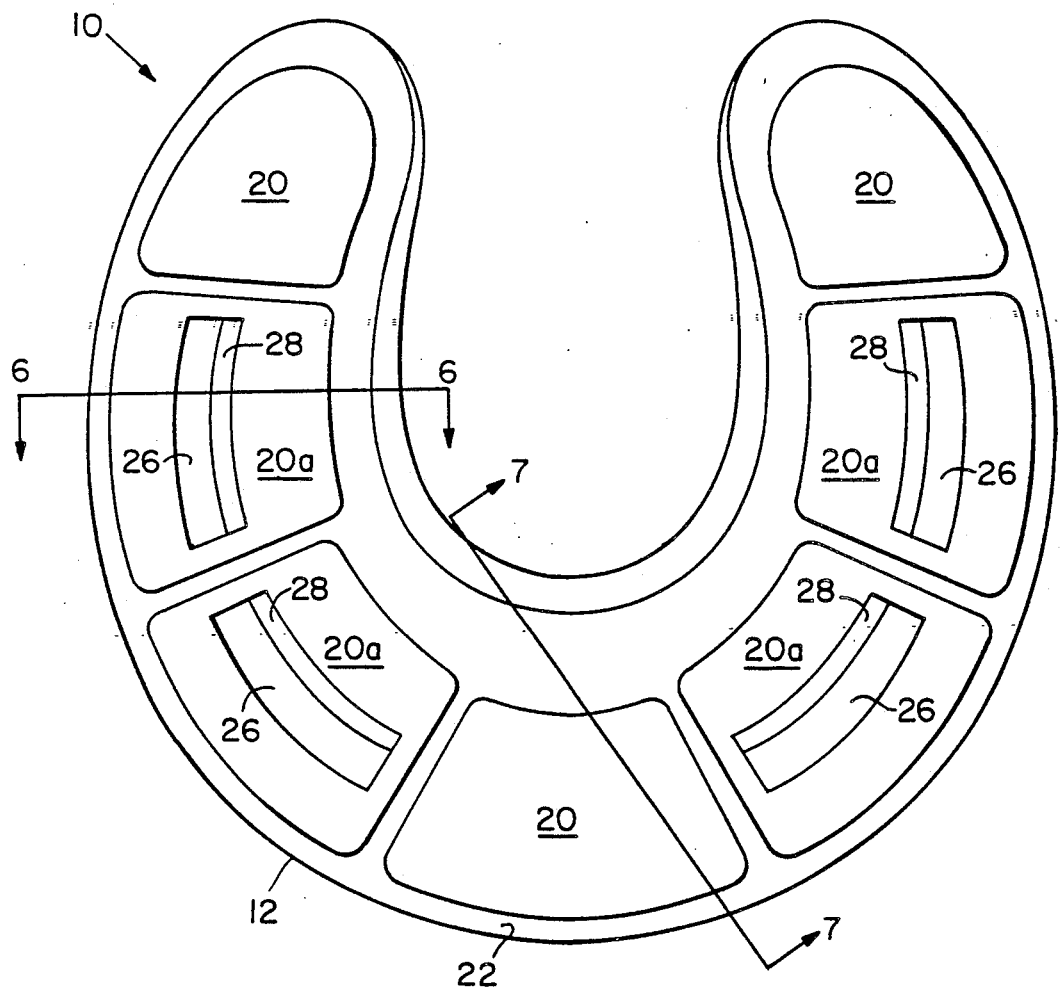
FIG. 5 is a view of the turf side of a shock absorbing horseshoe.
Figure 6:
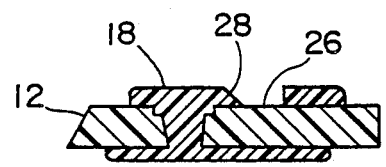
FIG. 6 is a sectional view at line 6—6 through FIG. 5.
Figure 7:
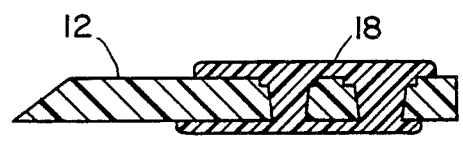
FIG. 7 is a sectional view at line 7—7 through FIG. 5.
Figure 8:
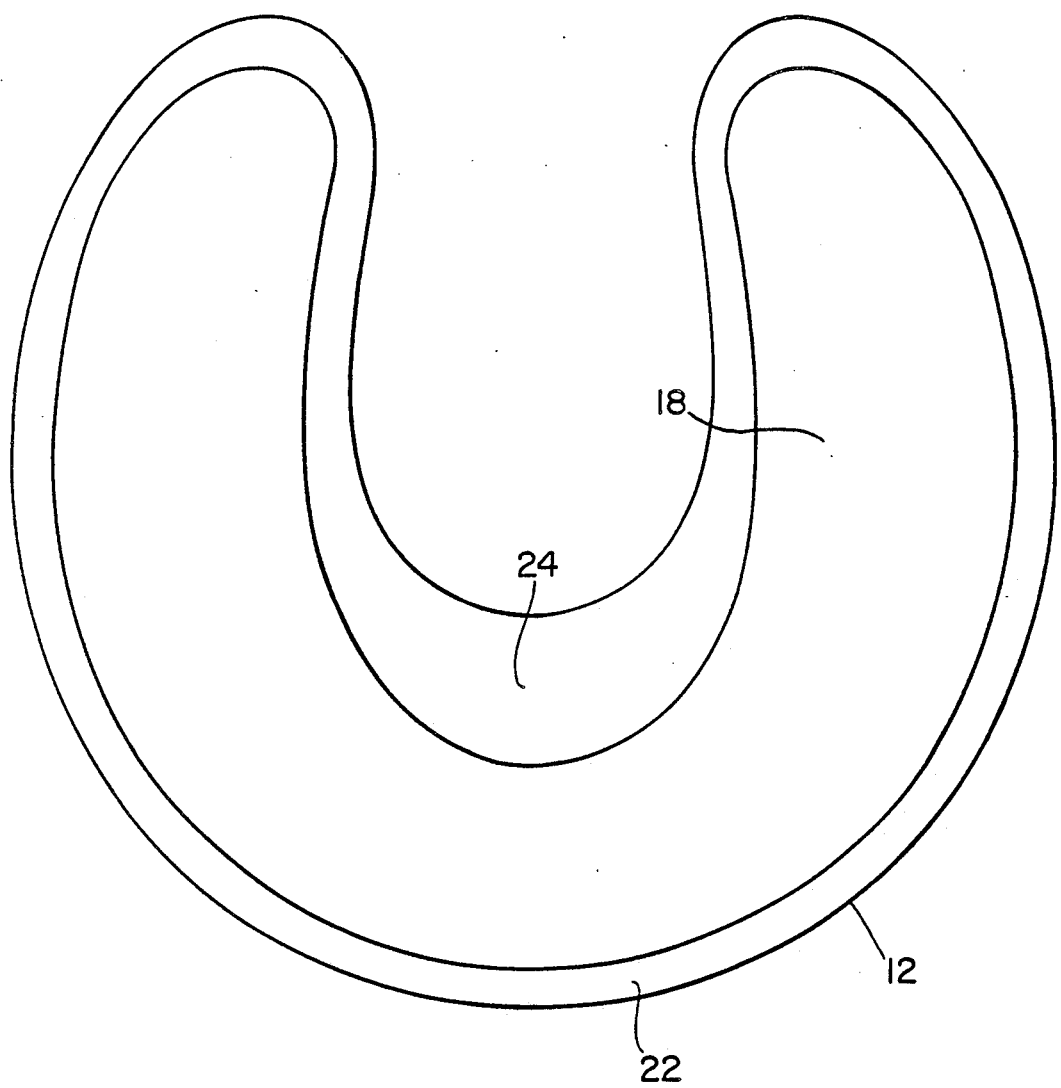
FIG. 8 is a view of the rear surface of the shock absorbing horseshoe of FIG. 5.

Referring to FIGS. 5-8, frame 12 is overmolded with a lower density urethane polymer (e.g. 70A polyurethane, (Dow Chemical Corporation) at a temperature sufficient to promote minimal melting of the surfaces of the primary frame and thus to assure adherence of the lower density polymer. The overmolding process produces, on the rear surface of the horseshoe (FIG. 8), generally horseshoe shaped pad 18, which conforms substantially to the shape of the frame, and leaves on the frame space 22 (0.240 inches across) around the perimeter of pad 18, except for the region 24 where the space widens out to be 0.800 inches across. Pad 18 is connected through holes 14 (Fig 1) in the primary frame with smaller pads 20 and 20a formed on the outer (turf side) surface of the primary frame. Pads 20 and 20a together conform to the shape of pad 18 on the reverse side of the frame, and pads 20 and 20a and 18, together with the material extending through holes 14, form one continuous unit of lower durometer material. Inset in pads 20a are rectangular nailing grooves 26, approximately 0.500 inches wide by 1.25 inches long. The inner edge 28 of the nailing grooves drops off at a 45° angle.

The polymers used in the shock absorbing horseshoe are preferably moldable, plastic, durable, and resilient, and the primary frame could be made from urethane that was not reinforced with glass fiber. The higher durometer polymer is preferably as hard as practical while the lower durometer polymer is chosen so that it will flow somewhat under the compression from the weight of the horse without collapsing. Some suitable polymers for the invention are polyvinyl chloride and polyurethane and thermoplastic rubbers. The polymers in the horseshoe may be different or may be of the same structure but of different durometers. Measures of hardness (durometer readings) are given by Shore A or Shore D units, two different scales which are used within the plastics industry.

Use

In use, the rear surface of the horseshoe is placed against the horse's hoof and nailed to the hoof in the conventional manner using nailing grooves 26. Groove 26 is shaped to conform to the shape of the head of a horseshoe nail but to be larger than the head, to permit renailing of the horseshoe to the same animal without having to use the same nailing position each time. The elastomeric properties of the high durometer polymer allow the material to grasp the nail securely so that it will not loosen under use.

As a horse shod in this manner runs, the horse's weight causes the lower durometer polymer to flow somewhat, i.e., there is limited compression of the polymer, thus dissipating the shock of the impact and reducing the stresses on the bones and ligaments of the foot and leg. The frame of a higher durometer material both provides the necessary rigidity to the horseshoe and acts as a damper for dissipating energy transmitted by the lower durometer material, preventing it from being reabsorbed by the horse's hoof. In addition, as the higher durometer material has limited or no contact with the ground, the horseshoe fabricated in this fashion gives excellent traction.

Other embodiments are within the following claims. For example, the horseshoe can be fabricated with the nailing grooves in a different orientation or with nailing holes instead of grooves. Alternatively, the horseshoe can be affixed to the hoof with an adhesive. Any configuration of higher and lower durometer polymers which will place the lower durometer polymer in contact with the ground when the horseshoe is in position, while the higher durometer polymer is in contact with the lower durometer polymer but not in contact with the horse's hoof is suitable for carrying out the invention.

We claim:

1. A durable, resilient plastic hoofed-animal shoe comprising, a first plastic polymer having a first durometer and characterized by absorbing significant energy from impact-related shock, and a second plastic polymer having a second durometer higher than said first durometer and characterized by dissipating significant energy from impact-related shock, wherein when said shoe is placed on a foot of a hoofed animal with said foot in contact with said first plastic polymer and said animal places weight on said foot and causes said shoe to come in contact with the ground, said first plastic polymer is simultaneously in contact with said foot, said second plastic polymer and said ground, and said second plastic polymer is in contact with said first plastic polymer and free of contact with said foot so that said first polymer may flow somewhat under compression from the weight of said hoofed animal without collapsing as the hoofed animal moves allowing limited compression of said first polymer and absorbing significant energy from impact-related sock while said second polymer provides rigidity to the horseshoe and acts as a damper for dissipating energy from impact-related shock transmitted by said first polymer to prevent the energy thus dissipated from being reabsorbed by said foot of said animal to help reduce stresses on the bones and ligaments of said foot and the leg of said hoofed animal.

2. The hoofed-animal shoe of claim 1 wherein said second polymer is in the shape of a horseshoe, has heel and toe portions and is formed with openings substantially filled with portions of said first plastic polymer, said openings being located along the length of said second plastic polymer with the density of said openings at the toe and heel portions of said second plastic polymer being greater than the density of said openings intermediate said heel and toe portions.

3. The hoofed-animal of claim 1 wherein said second plastic polymer is also free of contact with said ground.

4. The hoofed-animal of claim 1 wherein one of said first and second polymers is moldable.

5. The hoofed-animal of claim 1 wherein both said first polymer and said second polymer are moldable.

6. The hoofed-animal of claim 1 wherein said second polymer is configured in the form of a stiffening frame.

7. The hoofed-animal of claim 1 wherein said second polymer is reinforced with glass fiber.

8. The hoofed-animal of claim 1 wherein said first plastic polymer and said second plastic polymer comprise polyurethane.

* * * * *